(12) United States Patent
Zhang et al.

(10) Patent No.: US 8,197,789 B2
(45) Date of Patent: Jun. 12, 2012

(54) METHOD OF SELECTIVELY ELIMINATING METALLIC CARBON NANOTUBES, SEMICONDUCTING CARBON NANOTUBES AND PREPARATION METHOD THEREOF USING THE SAME

(75) Inventors: Jin Zhang, Beijing (CN); Yi Zhang, Beijing (CN); Yongyi Zhang, Beijing (CN); Zhongfan Liu, Beijing (CN)

(73) Assignees: Samsung Electronics Co., Ltd. (KR); Peking University (CN)

( * ) Notice: Subject to any disclaimer, the term of this patent is extended or adjusted under 35 U.S.C. 154(b) by 622 days.

(21) Appl. No.: 12/277,688

(22) Filed: Nov. 25, 2008

(65) Prior Publication Data

US 2009/0214411 A1    Aug. 27, 2009

(30) Foreign Application Priority Data

Nov. 30, 2007    (CN) .......................... 2007 1 0178428

(51) Int. Cl.
*D01F 9/12*       (2006.01)
*C01B 31/02*   (2006.01)
(52) U.S. Cl. ..................... 423/447.1; 423/461; 977/734; 977/845
(58) Field of Classification Search ............... 250/492.1, 250/492.2; 423/447.1, 447.2, 447.3, 461; 977/743, 845
See application file for complete search history.

(56) References Cited

U.S. PATENT DOCUMENTS

| | | | |
|---|---|---|---|
| 4,820,906 A * | 4/1989 | Stultz | 219/405 |
| 7,014,737 B2 * | 3/2006 | Harutyunyan et al. | 204/158.2 |
| 7,131,537 B2 | 11/2006 | Papadimitrakopoulos | |
| 7,161,107 B2 | 1/2007 | Krupke et al. | |
| 7,217,404 B2 * | 5/2007 | Ajayan et al. | 423/447.1 |
| 7,659,139 B2 * | 2/2010 | Huang | 438/99 |
| 2004/0232073 A1 | 11/2004 | Papadimitrakopoulos | |
| 2006/0013758 A1 * | 1/2006 | Iijima et al. | 423/447.3 |
| 2010/0003809 A1 * | 1/2010 | Huang | 438/478 |

FOREIGN PATENT DOCUMENTS

| | | |
|---|---|---|
| JP | 08231210 | 9/1996 |
| JP | 2006188380 | 7/2006 |
| KR | 1020070049116 | 5/2007 |

OTHER PUBLICATIONS

Huang, et al., Preferential Destruction of Metallic Single-Walled Carbon Nanotubes by Laser Irradiation, J. Phys. Chem. B. 2006; 110: 7316-7320.*
Zhang, et al., Sorting out Semiconducting Single-Walled Carbon Nanotube Arrays by Preferential Destruction of Metallic Tubes Using Xenon-Lamp Irradiation, J. Phys. Chem. C. 2008; 112: 3849-3856 (published online Feb. 20, 2008).*

* cited by examiner

*Primary Examiner* — Daniel C. McCracken
(74) *Attorney, Agent, or Firm* — Cantor Colburn LLP

(57) ABSTRACT

Metallic carbon nanotubes ("CNTs") may be selectively eliminated and semiconducting CNTs may be prepared using light-irradiation. The light provided by the light-irradiation may have a wavelength of about 180 nm to about 11 μm. Further, the light may have an intensity of about 30 mW/cm$^2$ to about 300 mW/cm$^2$. The light-irradiation may be simple and controllable, and may not require any special instruments except a light source.

15 Claims, 7 Drawing Sheets

US 8,197,789 B2

METHOD OF SELECTIVELY ELIMINATING METALLIC CARBON NANOTUBES, SEMICONDUCTING CARBON NANOTUBES AND PREPARATION METHOD THEREOF USING THE SAME

This application claims priority to Chinese Patent Application No. 200710178428.5, filed on Nov. 30, 2007, and all the benefits accruing therefrom under U.S.C. §119, the contents of which in its entirety are herein incorporated by reference.

BACKGROUND

1. Field

This disclosure relates to a method for selectively eliminating metallic carbon nanotubes ("CNTs"), a method for preparing semiconducting CNTs using the same and semiconducting CNTs prepared therefrom.

2. Description of the Related Art

Electrical properties of carbon nanotubes ("CNTs") may depend on their diameter and chirality. In general, CNTs may exhibit a conductivity similar to that of metal (referred to metallic CNTs) when the chirality indices (n, m) meet the relationship $|n-m|=3q$ (where q is an integer). Further, CNTs may exhibit semiconducting characteristic (referred to semiconducting CNTs) when $|n-m|\approx3q$.

Methods for separating metallic CNTs and semiconducting CNTs, selectively eliminating metallic CNTs or selectively synthesizing semiconducting CNTs may be available. These methods may be classified as follows:

(1) Separation of metallic CNTs and semiconducting CNTs through selective adsorption or selective elimination of metallic CNTs via selective chemical reaction in solution;

(2) Elimination of metallic CNTs through selective reaction using methane plasma; and (3) Selective synthesis of semiconducting CNTs through arc discharge, laser ablation, plasma enhanced chemical vapor deposition ("PECDV"), or the like.

SUMMARY

Metallic carbon nanotubes ("CNTs") may be selectively eliminated from starting CNTs and semiconducting CNTs may be prepared through light-irradiation. The light may have selected wavelength. Further, the light may have selected intensity.

Disclosed herein is an exemplary embodiment wherein a method for selectively eliminating metallic CNTs may have irradiating CNT with light having a wavelength of about 180 nm to about 11 μm and an intensity of about 30 mW/cm² to about 300 mW/cm².

Disclosed herein too is an exemplary embodiment wherein a method for preparing semiconducting CNTs may have providing CNTs including metallic CNTs and semiconducting CNTs; and obtaining the semiconducting CNTs by selectively eliminating the metallic CNTs through irradiating the CNTs with light having a wavelength of about 180 nm to about 11 μm and an intensity of about 30 mW/cm² to about 300 mW/cm².

Disclosed herein too is an exemplary embodiment about semiconducting CNTs obtainable by selectively eliminating metallic CNTs from CNTs including metallic CNTs and semiconducting CNTs through irradiating the CNTs with light having a wavelength of about 180 nm to about 11 μm and an intensity of about 30 mW/cm² to about 300 mW/cm².

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
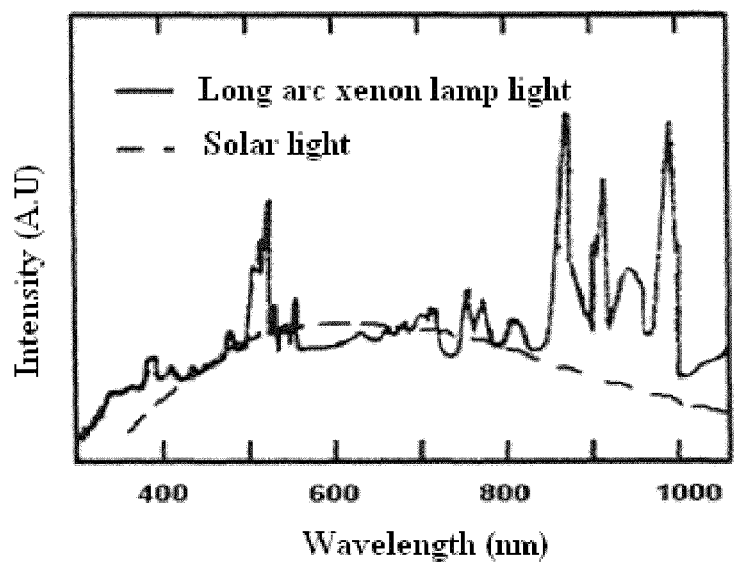
FIG. 1 shows wavelength-intensity spectrum of long arc xenon lamp light used in an exemplary embodiment, together with that of solar light, where the X axis represents wavelength (nm) and the Y axis represents intensity (arbitrary unit)

Exemplary embodiments now will be described more fully hereinafter with reference to the accompanying drawings, in which exemplary embodiments are shown. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the description, details of well-known features and techniques may be omitted to avoid unnecessarily obscuring the presented embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, the use of the terms a, an, etc. do not denote a limitation of quantity, but rather denote the presence of at least one of the referenced item. The use of the terms "first", "second", and the like do not imply any particular order, but are included to identify individual elements. Moreover, the use of the terms first, second, etc. do not denote any order or importance, but rather the terms first, second, etc. are used to distinguished one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Metallic carbon nanotubes ("CNTs") may be selectively and easily destroyed by irradiating the metallic CNTs with light. The light may have a selected wavelength. Further, the light may have selected intensity.

As compared with semiconducting CNTs, metallic CNTs may have a relatively higher electron density of states ("DOS"). Therefore, when irradiating CNTs including metallic CNTs and semiconducting CNTs with the light, resonance absorption may occur more readily in metallic CNTs than in semiconducting CNTs, which results in a higher electronic energy state of metallic CNTs, and to this end, their easy destruction due to heat-generation and oxidation.

In an exemplary embodiment, the light irradiated on the CNTs may have a wavelength of about 180 nm to about 11 μm. Further, the intensity of the light may be about 30 mW/cm$^2$ to about 300 mW/cm$^2$. The wavelength and the intensity may be selected considering selective oxidation and elimination of the metallic CNTs. The wavelength of light may be related with whether resonance will occur or not, and the intensity may be related to the amount of the resonance. If the wavelength is less than about 180 nm and more than about 11 μm, or the intensity is less than about 30 mW/cm$^2$ and more than about 300 mW/cm$^2$, the metallic CNTs may not be selectively eliminated.

The intensity of light may be represented by energy per unit area (W/cm$^2$) of a surface onto which the light is irradiated (i.e., the surface on which CNTs exist).

The light may be irradiated by using a light source. As non-limiting examples of the light source, xenon lamp, an infra red ("IR") lamp, any combination lamp thereof, or the like may be used. Further, the light may have a continuous spectrum.

A xenon lamp may be a light source used in an exemplary embodiment.

The xenon lamp may have a color temperature of about 6000 K and exhibits a continuous light spectrum. FIG. 1 shows wavelength-intensity spectrum of long arc xenon lamp with that of solar light. In FIG. 1, X axis represents wavelength (nm) and Y axis represents intensity (arbitrary unit). As seen in FIG. 1, the light spectrum of the long arc xenon lamp may be continuous over about 180 nm to about 11 μm.

CNTs may typically comprise CNTs with different diameters. Electron density of states of CNTs may be different depending on the diameters. Accordingly, the wavelength of light causing resonance absorption may be different depending on the diameters of CNTs. A light source having a continuous spectrum may be used in order to induce resonance absorption in metallic CNTs having different diameters. For example, a xenon lamp may be used because it has a continuous spectrum over a wide wavelength covering about 180 nm to about 11 μm and, thus, is capable of inducing resonance absorption in metallic CNTs having different diameters. Further, a xenon lamp may be easy to obtain, handle or use.

As for non-limiting examples of the xenon lamp, the xenon lamp may be a long arc xenon lamp, a high-pressure xenon lamp, a spherical xenon lamp, a high-pressure spherical xenon lamp, any combination lamp thereof, or the like.

The irradiation time of light may be adjusted in terms of the wavelength and the intensity of the light. In an exemplary embodiment, light with a wavelength of about 180 nm to about 11 μm and an intensity of about 30 mW/cm$^2$ to about 300 mW/cm$^2$ may be irradiated for about 5 minutes to about 240 minutes.

That is, in an exemplary embodiment, the light irradiation time may be determined within about 5 to about 240 minutes, considering elimination efficiency of metallic CNTs and/or prevention of damage of semiconducting CNTs. The irradiation time may be different depending on the concrete wavelength and/or intensity.

When the light is irradiated for less than about 5 minutes, there is a possibility that metallic CNTs may not be eliminated easily even though the light intensity is increased. Considering the elimination efficiency of metallic CNTs, the irradiation time may be about 30 minutes or more. When the irradiation time is about 60 minutes or more, the metallic CNTs may possibly be eliminated in most parts. If the irradiation time is more than about 240 minutes, there is a possibility that semiconducting CNTs may be damaged. In terms of decreasing damage of the semiconducting CNTs, the irradiation time may be less than about 150 minutes.

In an exemplary embodiment, state-change of CNTs according to light-irradiation may be measured. The measured result may be used for controlling variables such as light-irradiation time, light intensity, a combination thereof, or the like. The term "state-change of CNTs" may be used to include all types of changes possibly occurring in CNTs including metallic CNTs and/or semiconducting CNTs due to light-irradiation. As for a non-limiting example of such measurement, how many metallic CNTs are eliminated due to light-irradiation may be measured.

As in a non-limiting example of the measurement, Raman spectroscopy may be used. By analyzing a Raman spectrum during light-irradiation, how many metallic CNTs are eliminated, presence of semiconducting CNTs, a combination thereof, or the like may be measured, which may lead to a determination of light-irradiation time or other variables. By analyzing the Raman spectrum, the light-irradiation may be controlled. For example, the light-irradiation may be stopped after checking disappearance of peak of metallic CNTs in the Raman spectrum. The Raman spectrum may be analyzed at least one wavelength. Raman spectrum at two or more wavelengths may be analyzed for increasing accuracy of the measurement.

In an exemplary embodiment, environmental condition may not be limited in a certain manner during light-irradiation. For instance, light-irradiation may be carried out in a gas environment of air, argon, oxygen, helium, hydrogen, methane, ethane, nitrogen or a combination thereof in order to selectively eliminate metallic CNTs and/or obtain semiconducting CNTs.

The light-irradiation according to exemplary embodiments may be used in applications requiring elimination of metallic CNT and/or preparation of semiconducting CNTs. The structural type of CNTs used in exemplary embodiments may not be restricted. Further, methods for manufacturing CNTs may not be restricted. As for non-limiting examples, the CNTs may include single-walled CNTs ("SWCNTs"), double-walled CNTs ("DWCNTs"), multi-walled CNTs ("MWCNTs"), rope type CNTs, carbon nanohorns, fullerene-containing type CNTs, or the like.

In an exemplary embodiment, SWCNTs may be used for eliminating metallic SWCNTs and to this end easily obtaining semiconducting SWCNTs. SWCNTs may typically include metallic CNTs and semiconducting CNTs. For instance, SWCNTs prepared using chemical vapor deposition ("CVD") may include metallic CNTs in an amount of about ⅓ of the total amount of CNTs and the semiconducting CNTs as the remainder (i.e., about ⅔). Carbon nanohorns which may have the same structure as that of SWCNTs may also be used for another exemplary embodiment.

Figure 2A:
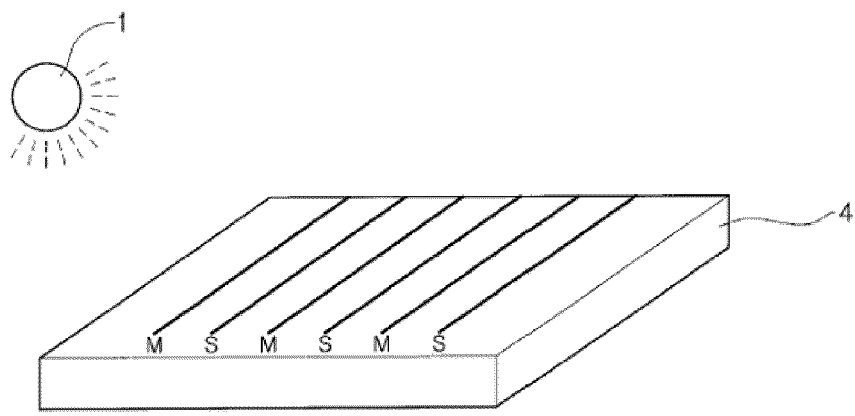
FIG. 2 schematically illustrates an exemplary embodiment where metallic carbon nanotubes (CNTs) may be selectively eliminated from CNTs including metallic CNTs and semiconducting CNTs, and semiconducting CNTs may be obtained.
Figure 2B:
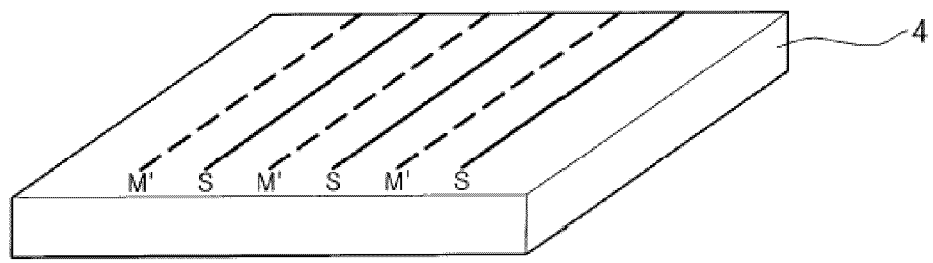

FIG. 2 schematically illustrates an exemplary embodiment where metallic carbon nanotubes ("CNTs") may be selectively eliminated from CNTs including metallic CNTs and semiconducting CNTs, and thus semiconducting CNTs may be obtained. It will be understood that FIGS. 2a and 2b are merely an exaggerated representation given for the purpose of illustration and does not show actual size, shape, procedure and the like.

Referring to FIG. 2a, semiconducting CNTs (S) and metallic CNTs (M) may be put on a substrate 4, and light with a wavelength of about 180 nm to about 11 μm and an intensity of about 30 mW/cm² to about 300 mW/cm² may be irradiated from a light source 1. FIG. 2a shows an aligned pattern of CNTs, but it is also possible to irradiate non-aligned CNTs with light. When using light-irradiation on aligned CNTs, aligned semiconducting CNTs may be obtained right after eliminating the metallic CNTs.

CNTs may be prepared on the surface of the substrate 4 using various methods. As for non-limiting examples, directly synthesizing CNTs on the substrate 4 by CVD such as high-pressure CO ("HiPco"), a catalytic decomposition of alcohol (e.g., alcohol CVD ("ACCVD"), catalytic CVD, etc., or transferring prepared CNTs onto the substrate 4, or dispersing CNTs on the substrate 4 using a solution of CNTs, any combination thereof, or the like may be used.

The materials of the substrate 4 may not be restricted. As for non-limiting examples, a substrate made of sapphire, single crystal silicon, polycrystalline silicon, silicon dioxide, quartz, gallium arsenide, etc. may be used.

Referring to FIG. 2b, metallic CNTs may have been eliminated (denoted as M') by light-irradiation from the light source 1.

As described above, it is possible to easily and selectively eliminate metallic CNTs by light-irradiation and thereby obtain semiconducting CNTs. Considering that the metallic CNTs may be eliminated within a short time through the light-irradiation, the elimination efficiency of the metallic CNTs may be high. Further, semiconducting CNTs having high-purity may be prepared without damage. The prepared semiconducting CNTs may be utilized in various devices requiring semiconducting CNTs such as field-emission transistors ("FETs"), etc, for example, but is not limited thereto.

The light-irradiation may be so simple and controllable that it may be applied to the process of eliminating metallic CNTs and/or preparing semiconducting CNTs. Further, the light-irradiation may not require any special instrument except for a light source, which may result in cost reduction and large-scale production of semiconducting CNTs. Furthermore, the light-irradiation may be environment-friendly.

Therefore, it can be said that the light-irradiation may be effectively used in various applications requiring elimination of metallic CNTs and/or for the preparation of semiconducting CNTs or other applications combined with such elimination and/or preparation.

The examples and experiments will now be described. The following examples and experiments are for illustrative purposes only and not intended to limit the scope of the present invention.

EXAMPLE 1

A single-walled carbon nanotubes ("SWCNTs") sample is prepared by growing SWCNTs on a single crystal sapphire substrate by CVD.

That is, a single crystal sapphire substrate having an a-plane (11-20) is put in a CVD chamber and annealing is carried out at about 1100° C. for about 2 hours in the air. Then, $Fe(OH)_3$ colloid particles in aqueous solution are printed at the end portion of the annealed substrate. The resultant substrate is put into a CVD chamber. Gas is supplied to the chamber and SWCNTs are grown at about 850° C. for about 5 minutes. For reference, the gas is the mixture of the following: (1) about 2300 sccm Ar, (2) about 300 sccm $H_2$, (3) ethanol containing about 3 wt % $H_2O$ (about 30° C.) bubbled by about 45 sccm Ar.

Figure 3A:
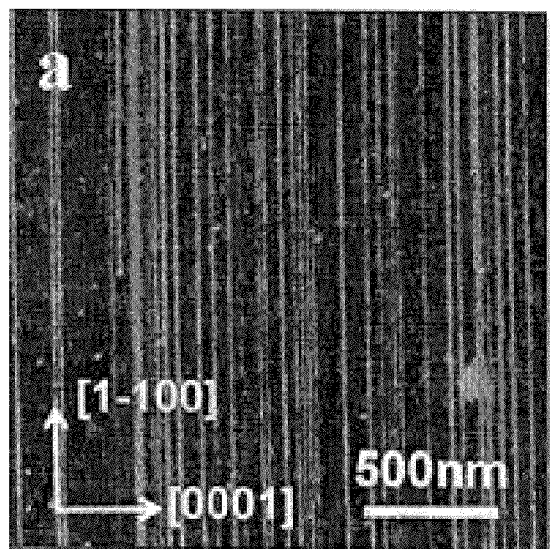
FIG. 3a is an atomic force microscopic ("AFM") image showing single-walled carbon nanotubes ("SWCNTs") grown on a surface of single crystal sapphire substrate in example 1.

FIG. 3a is an AFM image showing single-walled carbon nanotubes ("SWCNTs") grown on a surface of the single crystal sapphire substrate in example 1. Referring to FIG. 3a, SWCNTs have grown along with the sapphire crystal lattice direction.

Light is irradiated on the SWCNTs sample using a long arc xenon lamp as a light source. The light intensity is maintained at about 75 mW/cm². Light irradiation is carried out in the air for about 60 minutes.

Figure 3B:
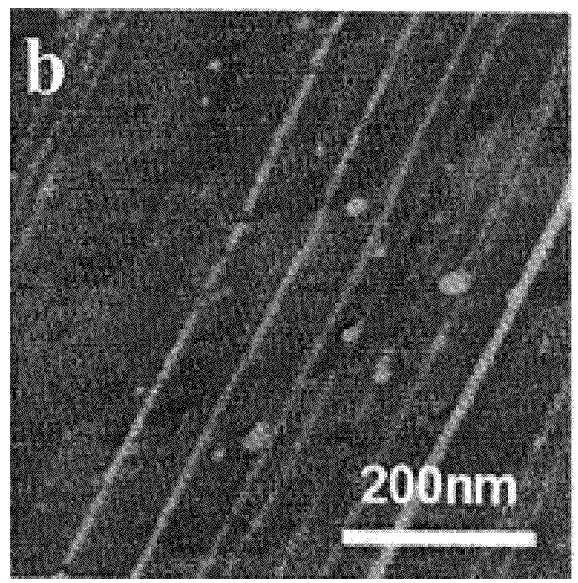
FIG. 3b is an AFM image showing change of SWCNTs after irradiation of the sample of SWCNTs of FIG. 3a with light in air for about 30 minutes.

FIG. 3b is an AFM image showing a change of SWCNTs after irradiation of the SWCNTs sample of FIG. 3a with light in air for about 30 minutes. Comparing FIG. 3b with FIG. 3a, it can be seen that some of the aligned SWCNTs (metallic SWCNTs) may have been eliminated.

Figure 3C:
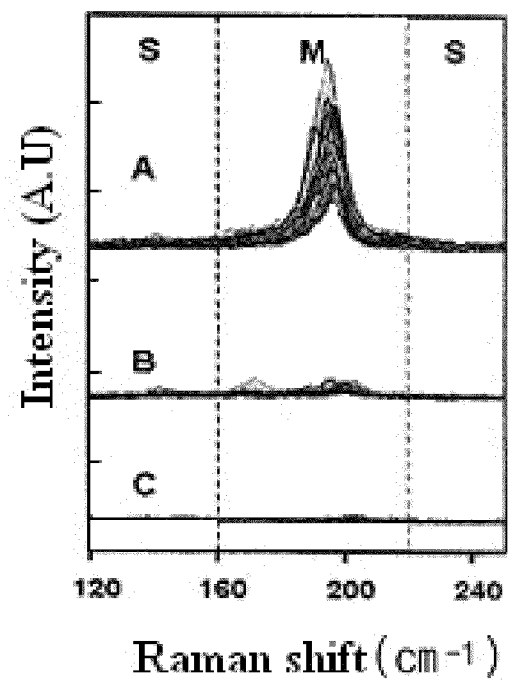
FIG. 3c is a Raman spectrum of SWCNTs at arbitrary 39 points of the sample of SWCNTs of example 1 in respective irradiation times (about 0, 30 and 60 minutes) using a laser excitation wavelength of about 633 nm, where the X axis represents Raman shift (cm$^{-1}$) and the Y axis represents intensity (arbitrary unit)
Figure 3D:
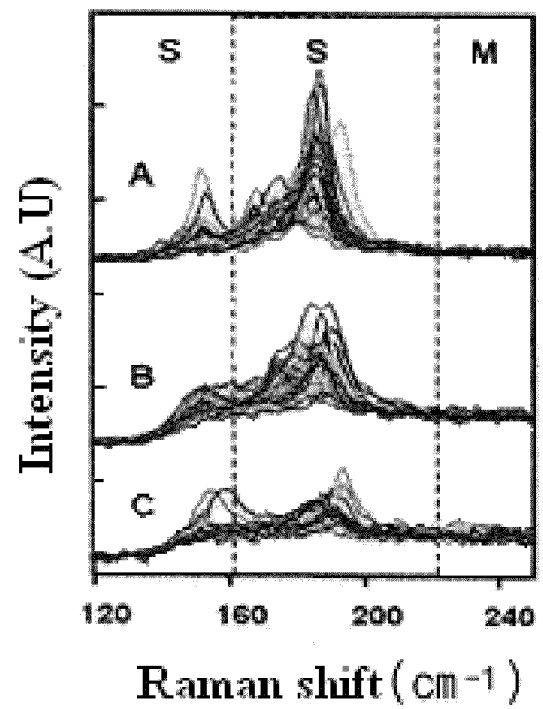
FIG. 3d is a Raman spectrum of SWCNTs at arbitrary 39 points of the same of SWCNTs of example 1 in respective irradiation times (about 0, 30 and 60 minutes) using a laser excitation wavelength of about 514 nm, where the X axis represents Raman shift (cm$^{-1}$) and the Y axis represents intensity (arbitrary unit)

FIGS. 3c and 3d each illustrate a Raman spectrum of SWCNTs at arbitrary 39 points of the SWCNTs sample of example 1 in respective irradiation times (about 0, 30 and 60 minutes). X axes represent Raman shift ($cm^{-1}$) and Y axes represent intensity (arbitrary unit). In FIG. 3c, the laser excitation wavelength is about 633 nm, and in FIG. 3d, the laser excitation wavelength is about 514 nm. In FIGS. 3c and 3d, (A), (B) and (C) correspond to irradiation times of about 0, 30 and 60 minutes, respectively.

In FIG. 3c, a Raman peak of the metallic SWCNTs (M) is observed without the light irradiation (about 0 minute) (graph A in FIG. 3c).

About thirty (30) minutes after the light irradiation, Raman peaks of the metallic SWCNTs (M) decrease rapidly (graph B in FIG. 3c).

About sixty (60) minutes after the light irradiation, Raman peaks of the metallic SWCNTs (M) disappear (graph C in FIG. 3c).

The state of the semiconducting SWCNTs may be checked through Raman spectrum at about 514 nm (FIG. 3d).

Referring to FIG. 3d, Raman peaks of semiconducting SWCNT S still exist after the light irradiation (about 0, 30 and 60 minutes), although the intensity somewhat decrease (graphs A, B and C in FIG. 3d).

Accordingly, it can be said that metallic CNTs may be eliminated by a simple process of light-irradiation and semiconducting CNTs having high-purity with no metallic CNTs may be obtained therethrough.

EXAMPLE 2

A SWCNTs sample is prepared by growing SWCNTs on a silicon dioxide substrate by CVD.

That is, $Fe(OH)_3$ colloid particles in aqueous solution are spin-coated on a substrate on which silicon dioxide is coated to have a thickness of about 100 nm. The resultant substrate is put in a CVD chamber. Gas is supplied to the chamber and SWCNTs are grown at about 850° C. for about 5 minutes. For reference, the gas is the mixture of the following: (1) about 2300 sccm Ar, (2) about 300 sccm $H_2$, and (3) ethanol containing about 3 wt % $H_2O$ (about 30° C.) bubbled by about 45 sccm Ar.

Figure 4A:
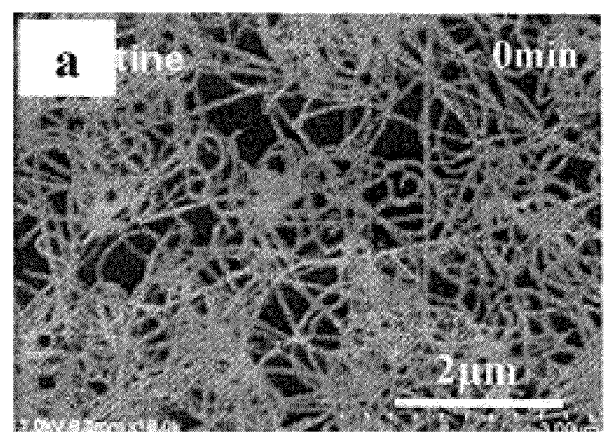
FIG. 4a is a scanning electron microscopic ("SEM") image showing SWCNTs grown on a surface of a silicon dioxide substrate in example 2.

FIG. 4a is a scanning electron microscopic ("SEM") image showing SWCNTs grown on a surface of the silicon dioxide substrate in example 2.

Light is irradiated on the SWCNTs sample using a long arc xenon lamp as a light source. The light intensity is maintained at about 75 mW/cm². Light irradiation is carried out in the air for about 60 minutes.

Figure 4B:
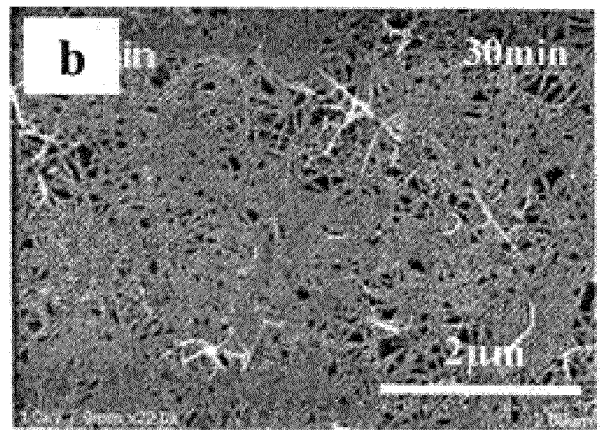
FIG. 4b is an SEM image showing a change of the SWCNTs after irradiation of the sample of SWCNTs of FIG. 4a with light in air for 30 minutes.

FIG. 4b is an SEM image showing a change in the SWCNTs after irradiation of the SWCNTs sample of FIG. 4a with light in air for about 30 minutes.

Comparing FIG. 4b with FIG. 4a, it can be seen that some of the aligned SWCNTs (metallic SWCNTs) are eliminated.

Figure 4C:
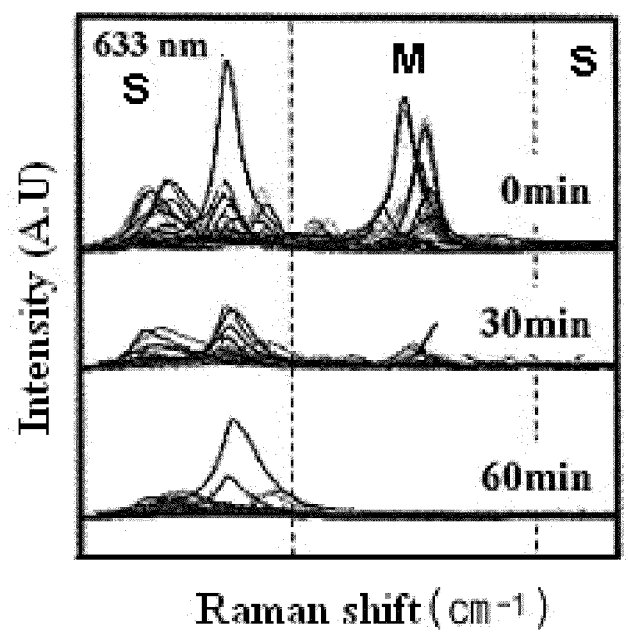
FIG. 4c is a Raman spectrum of SWCNTs at arbitrary 39 points of the sample of SWCNTs of example 2 in respective irradiation times (about 0, 30 and 60 minutes) using a laser excitation wavelength of about 633 nm, where the X axis represents Raman shift (cm$^{-1}$) and the Y axis represents intensity (arbitrary unit)

FIG. 4c shows Raman spectrum of SWCNTs at arbitrary 39 points of the SWCNTs sample of example 2 in respective irradiation times (about 0, 30 and 60 minutes). In FIG. 4c, the laser excitation wavelength is about 633 nm. The X axis represents Raman shift (cm$^{-1}$) and the Y axis represents intensity (arbitrary unit).

In FIG. 4c, Raman peaks of the metallic SWCNTs (M) and Raman peaks of semiconducting SWCNTs (S) are observed without the light irradiation (about 0 minute) ("0 min" in FIG. 4c).

About thirty (30) minutes after the light irradiation, only Raman peaks of the metallic SWCNTs (M) decrease rapidly. Raman peaks of semiconducting SWCNTs (S) remain without apparent change ("30 min" in FIG. 4c).

About sixty (60) minutes after the light irradiation, Raman peaks of the metallic SWCNTs (M) disappear (graph C of FIG. 3c). Raman peaks of semiconducting SWCNTs (S) still remain although they somewhat decrease ("60 min" in FIG. 4c).

In order to more closely investigate the state of the semiconducting SWCNTs (S) about 60 minutes after the light irradiation, Raman spectrum is analyzed after changing the laser excitation wavelength to about 514 nm.

Figure 4D:
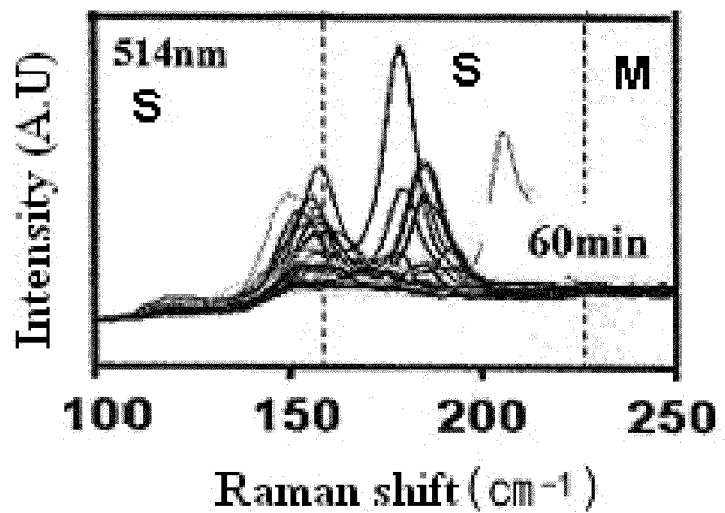
FIG. 4d is a Raman spectrum of SWCNTs at arbitrary 39 points of the sample of SWCNTs of example 2 in irradiation time (about 60 minutes) using a laser excitation wavelength of about 514 nm, where the X axis represents Raman shift (cm$^{-1}$) and the Y axis represents intensity (arbitrary unit).

FIG. 4d shows Raman spectrum of SWCNTs at arbitrary 39 points of the SWCNTs sample of example 2 in irradiation time (about 60 minutes). The X axis represents Raman shift (cm$^{-1}$) and the Y axis represents intensity (arbitrary unit). In FIG. 4c, the laser excitation wavelength is about 514 nm.

Referring to FIG. 4d, Raman peaks of semiconducting SWCNTs (S) are observed about 60 minutes after the light irradiation without apparent change.

Accordingly, it can be said that metallic CNTs may be eliminated by a simple process of light-irradiation and that semiconducting CNTs having high-purity with no metallic CNTs may be obtained therethrough. This is the same case though the substrate is changed from the single crystal sapphire substrate to a silicon dioxide substrate.

EXAMPLE 3

SWCNTs sample is prepared by growing and aligning SWCNTs on a single crystal sapphire substrate by CVD and transferring the aligned SWCNTs onto a silicon dioxide substrate using a polymer compound film.

That is, a single crystal sapphire substrate having an a-plane (11-20) is put in a CVD chamber and annealing is carried out at about 1100° C. for about 2 hours in the air. Then, $Fe(OH)_3$ colloid particles in aqueous solution are printed at the end portion of the annealed substrate. The resultant substrate is put in a CVD chamber. Gas is supplied to the chamber and SWCNTs are grown at about 850° C. for about 5 minutes. For reference, the gas is a mixture of the following: (1) about 2300 sccm Ar, (2) about 300 sccm $H_2$, and (3) ethanol containing about 3 wt % $H_2O$ (about 30° C.) bubbled by about 45 sccm Ar.

Polydimethylsiloxane ("PDMS") polymer film is contacted on the substrate on which the CNTs have grown. The film is pressed and slowly released. The CNTs on the substrate are transferred onto the PDMS polymer film. The PDMS polymer film having the transferred CNTs thereon is contacted on a substrate on which silicon dioxide is coated to have a thickness of about 100 nm. The film is pressed and slowly released again. The CNTs are transferred onto the silicon dioxide substrate.

Figure 5A:
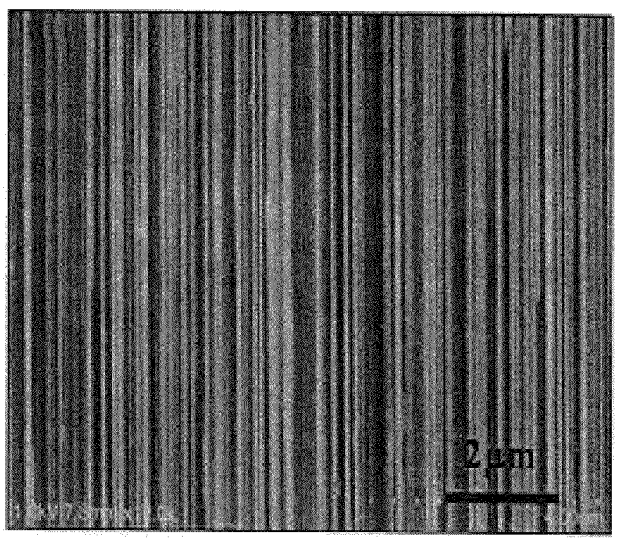
FIG. 5a is an SEM image showing SWCNTs transferred onto a surface of a silicon dioxide substrate in example 3.

FIG. 5a is an SEM image showing SWCNTs transferred onto the surface of the silicon dioxide substrate in example 3. Referring to FIG. 5a, it can be seen that the SWCNTs are well aligned on the surface of the silicon dioxide substrate.

Light is irradiated on the SWCNTs sample using a long arc xenon lamp as a light source. The light intensity is maintained at about 75 mW/cm². Light irradiation is carried out in the air for about 120 minutes.

Figure 5B:
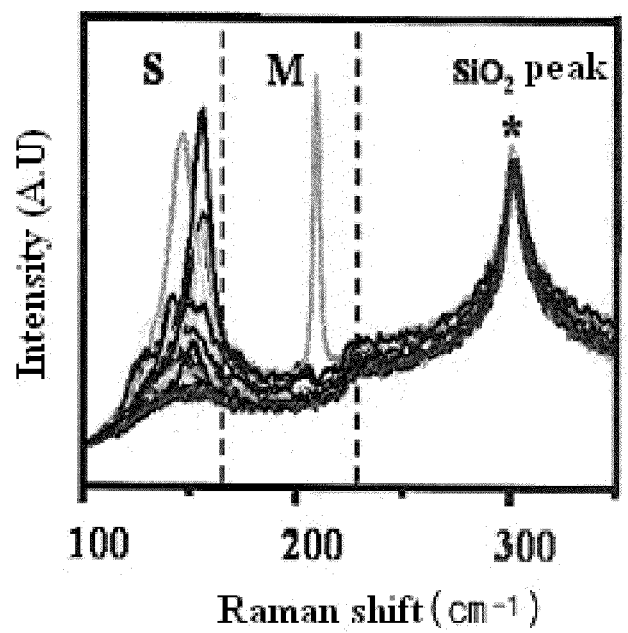
FIG. 5b is a Raman spectrum of SWCNTs at arbitrary 39 points of the sample of SWCNTs of example 3 in irradiation time (about 120 minutes) using a laser excitation wavelength of about 633 nm, where the X axis represents Raman shift (cm$^{-1}$) and the Y axis represents intensity (arbitrary unit).

FIG. 5b shows Raman spectrum of SWCNTs at arbitrary 39 points of the SWCNTs sample of example 3 in irradiation time (about 120 minutes). In FIG. 5b, the laser excitation wavelength is about 633 nm. The X axis represents Raman shift (cm$^{-1}$) and the Y axis represents intensity (arbitrary unit)

In FIG. 5b, Raman peaks of the metallic SWCNTs (M) are small (Raman shift of about 160 cm$^{-1}$ to about 230 cm$^{-1}$) and Raman peaks of semiconducting SWCNTs (S) are dominant (Raman shift of less than about 160 cm$^{-1}$). Thus, it can be seen that about 120 minutes after the light-irradiation, the semiconducting SWCNTs may remain, although the metallic SWCNTs may be eliminated.

Accordingly, as in the preceding examples, it can be said that metallic CNTs may be eliminated from SWCNTs which are transferred on the silicon dioxide substrate by a simple process of light-irradiation and that aligned semiconducting CNTs may be obtained effectively therethrough.

While the exemplary embodiments have been shown and described, it will be understood by those skilled in the art that various changes in form and details may be made thereto without departing from the spirit and scope of the present invention as defined by the appended claims.

In addition, many modifications can be made to adapt a particular situation or material to the teachings of the invention without departing from the essential scope thereof. Therefore, it is intended that the present invention not be limited to the particular exemplary embodiments disclosed as the best mode contemplated for carrying out this invention, but that the present invention will include all embodiments falling within the scope of the appended claims.

What is claimed is:

1. A method for selectively eliminating metallic carbon nanotubes, the method comprising:
    irradiating carbon nanotubes with light having a continuous spectrum of wavelengths of about 180 nm to about 11 μm and an intensity of about 30 mW/cm$^2$ to about 300 mW/cm$^2$ to selectively eliminate metallic carbon nanotubes.

2. The method for selectively eliminating metallic carbon nanotubes according to claim 1, wherein the light is provided by at least one selected from the group consisting of a xenon lamp, an infrared lamp and any combination lamp thereof.

3. The method for selectively eliminating metallic carbon nanotubes according to claim 1, wherein the light is provided by at least one selected from the group consisting of a long arc xenon lamp, a high-pressure xenon lamp, a spherical xenon lamp, a high-pressure spherical xenon lamp and any combination lamp thereof.

4. The method for selectively eliminating metallic carbon nanotubes according to claim 1, wherein an irradiation time of the irradiating is about 5 minutes to about 240 minutes.

5. The method for selectively eliminating metallic carbon nanotubes according to claim 1, wherein the carbon nanotubes are single-walled carbon nanotubes or carbon nanohorns.

6. A method for preparing semiconducting carbon nanotubes, the method comprising:
    providing carbon nanotubes comprising metallic carbon nanotubes and semiconducting carbon nanotubes; and
    selectively eliminating the metallic carbon nanotubes by irradiating the carbon nanotubes with light having a continuous spectrum of wavelengths of about 180 nm to about 11 μm and a light intensity of about 30 mW/cm$^2$ to about 300 mW/cm$^2$ to prepare semiconducting carbon nanotubes.

7. The method for preparing semiconducting carbon nanotubes according to claim 6, wherein the light is provided by at least one selected from the group consisting of a xenon lamp, an infrared lamp and any combination lamp thereof.

8. The method for preparing semiconducting carbon nanotubes according to claim 6, wherein an irradiation time of the irradiating is about 5 minutes to about 240 minutes.

9. The method for preparing semiconducting carbon nanotubes according to claim 6, wherein the carbon nanotubes comprising metallic carbon nanotubes and semiconducting carbon nanotubes are prepared using chemical vapor deposition.

10. The method for preparing semiconducting carbon nanotubes according to claim 6, wherein,
    the providing carbon nanotubes comprising metallic carbon nanotubes and semiconducting carbon nanotubes further comprises providing the carbon nanotubes comprising metallic carbon nanotubes and semiconducting carbon nanotubes aligned or non-aligned on a substrate, and after the selectively eliminating the semiconducting carbon nanotubes are aligned or non-aligned on the substrate.

11. The method for preparing semiconducting carbon nanotubes according to claim 6, further comprising
    measuring a change of an amount of metallic carbon nanotubes, an amount of semiconducting carbon nanotubes or the combination thereof, and
    selecting at least one selected from the group consisting of a light-irradiation time, and the light intensity in response to the change of an amount of metallic carbon nanotubes, an amount of semiconducting carbon nanotubes or the combination thereof.

12. The method for preparing semiconducting carbon nanotubes according to claim 11, wherein the measuring a change an amount of metallic carbon nanotubes, an amount of semiconducting carbon nanotubes or the combination thereof comprises measuring with Raman spectroscopy.

13. The method for preparing semiconducting carbon nanotubes according to claim 12, wherein the irradiating is stopped after disappearance of a peak corresponding to metallic carbon nanotubes in a Raman spectrum.

14. The method for preparing semiconducting carbon nanotubes according to claim 12, further comprising analyzing a Raman spectrum at two or more wavelengths.

15. The method for preparing semiconducting carbon nanotubes according to claim 6, wherein the carbon nanotubes are single-walled carbon nanotubes or carbon nanohorns.

* * * * *